(12) United States Patent
Bork et al.

(10) Patent No.: US 6,246,376 B1
(45) Date of Patent: Jun. 12, 2001

(54) WIRELESS LOCATION AND DIRECTION INDICATOR FOR MULTIPLE DEVICES

(75) Inventors: Stephan Bork, Dallas, TX (US); Oren Eliezer, Sde-Varburg (IL); Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/605,485

(22) Filed: Jun. 28, 2000

(51) Int. Cl.[7] ....................................................... G01S 5/02
(52) U.S. Cl. ........................................ 343/760; 342/357.13
(58) Field of Search ..................................... 343/760, 703; 342/357.13, 357.06; 340/988, 426

(56) References Cited

U.S. PATENT DOCUMENTS 6,023,241 * 11/1998 Clapper ............................ 342/357.13
6,028,537 * 2/2000 Suman et al. ......................... 340/988

* cited by examiner

Primary Examiner—Tan Ho
Assistant Examiner—James Clinger
(74) Attorney, Agent, or Firm—Dwight N. Holmbo; Wade James Brady, III; Frederick J. Telecky, Jr.

(57) ABSTRACT

A system and method for wireless communication between two devices allows the transfer of location information through a cellular or "BLUETOOTH" link that can be used to provide a continuous indication of estimated distance and direction relative to the two devices in communication with one another.

19 Claims, 3 Drawing Sheets

WIRELESS LOCATION AND DIRECTION INDICATOR FOR MULTIPLE DEVICES

BACKGROUND OF THE INVENTION

1. Field of the Invention

This invention relates generally to wireless communications, and more particularly to a wireless system and method for locating positions of multiple wireless devices relative to one another.

2. Description of the Prior Art

Today there are handheld global positioning system (GPS) devices available that display the position of the device (longitude and latitude). These devices do not communicate with each other and cannot indicate to each other their positions relative to one another. Further, these devices have undesirable limited accuracy since they make use of non-military GPS systems inhibiting the devices from providing location data having accuracy necessary to locate objects such as a car in a big parking lot, a child in a crowd, child in a theme park, or even a fixed known location (such as a shop in a mall or a booth in an expo).

In view of the foregoing discussion, a need exists in the wireless communications art for a device capable of communicating with other like devices for the purpose of direction finding intended to overcome the absence of GPS data or inaccuracies in such GPS data.

SUMMARY OF THE INVENTION

The present invention is directed to a wireless communications device, e.g. cellular and/or "BLUETOOTH" (see www.bluetooth.com), capable of communicating with like communication devices to transfer identification data and either fixed or variable location data, and analyzing an identified "BLUETOOTH" signal, in combination with indications from an electronic compass, for the purpose of direction finding intended to overcome the absence of GPS data or inaccuracies in such GPS data. Present telecommunication system technology includes a wide variety of wireless networking systems associated with both voice and data communications. One exemplary system is named "BLUETOOTH" after a $10^{th}$ century Scandinavian king who united several Danish kingdoms. This system operates in the 2.4 GHz band and advantageously offers short-range wireless communication between "BLUETOOTH" devices without the need for a central network.

The "BLUETOOTH" system provides a 1 Mb/sec data rate with low energy consumption for battery powered devices operating in the 2.4 GHz ISM (industrial, scientific, medical) band. The current "BLUETOOTH" system provides up to 100-meter range capability and an asymmetric data transfer rate of 721 kb/sec. The protocol supports a maximum of three voice channels for synchronous, CVSD-encoded transmission at 64 kb/sec. The "BLUETOOTH" protocol treats all radios as peer units identified by unique 48-bit addresses. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical "BLUETOOTH" master devices include cordless phone base stations, local area network (LAN) access points, laptop computers, or bridges to other networks. "BLUETOOTH" slave devices may include cordless handsets, cell phones, headsets, personal digital assistants, digital cameras, or computer peripherals such as printers, scanners, fax machines and other devices.

The "BLUETOOTH" protocol uses time-division duplex (TDD) to support bi-directional communication. Frequency hopping spread-spectrum technology accommodating frequency diversity permits operation in noisy environments and permits multiple piconets to exist in close proximity. This is so since frequency diversity is inherent in frequency hopping, especially when it is wide, as in the case of "BLUETOOTH" (spread over a band of about 80 MHz). The frequency hopping transmission hops at a rate of 1600 hops per second over 791-MHz channels between 2402 MHz and 2480 MHz. Various error-correcting schemes permit data packet protection by ⅓- and ⅔-rate forward error correction. Further, "BLUETOOTH" uses retransmission of packets for guaranteed reception. These schemes help correct data errors, but at the expense of throughput.

A wireless location and direction indicator device in one embodiment of the present invention is equipped with a cell phone having a micro controller unit (MCU), a GPS receiver, a "BLUETOOTH" unit and a 'Northfinder'. The device protocol communicates its present location to a trusted device such as another like device having GPS capability. When a user activates a specific protocol on device A, it pages device B and requests location data specific to device B. Device B transmits the requested location data and device A then uses the information transmitted by device B in combination with the angle (θ) between the axis of device A and North that is provided by the Northfinder, as well as device A's own position to display the direction and distance to device B on the display of device A. The direction indication on the screen of device A is most preferably updated continuously since device B may have moved along with its user. Radio communication between device A and device B is implemented using "BLUETOOTH" techniques or by alternative cellular techniques when an extended communication range is required.

GPS is an accurate three-dimensional global positioning satellite system which provides radio positioning and navigation needs. A GPS receiver and data processor is hosted by the present portable location and direction indicator. Generally, the GPS is initiated when the receiver starts to track pseudo-random noise from a plurality of satellites and generates time-of-arrival values. Thereafter, the GPS data processor takes over. The GPS data processor first samples the time-of-arrival values from the GPS constellation for each of the aforesaid plurality of satellites and multiplies the sample data by the speed of light to produce a plurality of pseudo-range measurements. The data processor then adjusts these pseudo-range measurements to compensate for deterministic errors such as the difference between each satellite's clock and GPS system time, atmospheric distortion of the signals and other considerations such as relativity factors. The GPS receiver includes an instruction set which gathers the information necessary to compute adjustments to the pseudo-range measurements from a 50 Hz digital data stream which the satellites broadcast along with their precision and coarse acquisition code. After the data processor makes all the necessary adjustments to the pseudo-range measurements, it then performs the position/time solution process to determine the present GPS receiver antenna position. The data processor computes its X, Y, Z position fix in terms of the World Geodetic System adapted in 1984, which is the basis on which the GPS develops its worldwide common grid references. Generally, the X, Y, Z coordinates are converted to latitude, longitude and altitude map datum prior to output or display. The GPS position solution is intrinsically referenced to the electrical phase center of the antenna. Finally, the data processor computes clock bias results which are one of the parameters to be considered in addition to the X, Y, Z coordinates. The clock bias is computed in terms of the time offset of the clock in the GPS receiver versus GPS system time. Accordingly, the present portable location and direction indicator receives the GPS position data which information is processed via the host processor such as a digital signal processor (DSP) to establish the present position.

As used herein, the following words have the following meanings. The words "algorithmic software" mean an algorithmic program used to direct the processing of data by a computer or data processing device. The words "data processor" and "data processing device" as used herein refer to a CPU, DSP, microprocessor, micro-controller, or other like device and an interface system. The interface system provides access to the data processing device such that data could be entered and processed by the data processing device. The words "discrete data" as used herein are interchangeable with "digitized data" and "digitized data" as used herein means data which are stored in the form of singularly isolated, discontinuous data or digits.

The present invention provides various technical advantages. In one aspect of the invention, a wireless location and direction indicator is provided that indicates the direction and distance to an object or person possessing a like indicator.

In another aspect of the invention, a GPS device is equipped with a magnetic or electronic compass, a "BLUETOOTH" radio and optionally integrated into a cellular telephone, that can communicate its location with another trusted device(s) through the "BLUETOOTH" or optional cellular link.

In yet another aspect of the invention, a device having a magnetic or electronic compass and "BLUETOOTH" radio, optionally integrated into a cellular telephone without GPS capability, can communicate its location with another trusted device(s) through the "BLUETOOTH" or optional cellular link.

In still another aspect of the invention, multiple location and direction indicator devices are implemented into a network to continuously locate each indicator device relative to one another.

In another aspect of the invention, a location and direction indicator device is provided with an alert to provide indications of the direction and distance to another like device in which a distance has exceeded a user-defined threshold.

In yet another aspect of the invention, multiple location and direction indicator devices devoid of GPS or "BLUETOOTH" capability are implemented into a cellular network allowing determination of relative positions among the location and direction indicator devices using triangulation techniques.

In still another aspect of the invention, a wireless location and direction indicator is provided with differential GPS capability (a ground-based derivative) to indicate the direction and distance to an object or person possessing a like indicator.

In still another aspect of the invention, a wireless location and direction indicator employs multiple receive antennas to determine range and angle between the wireless location and direction indicator and an object or person possessing a like indicator.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
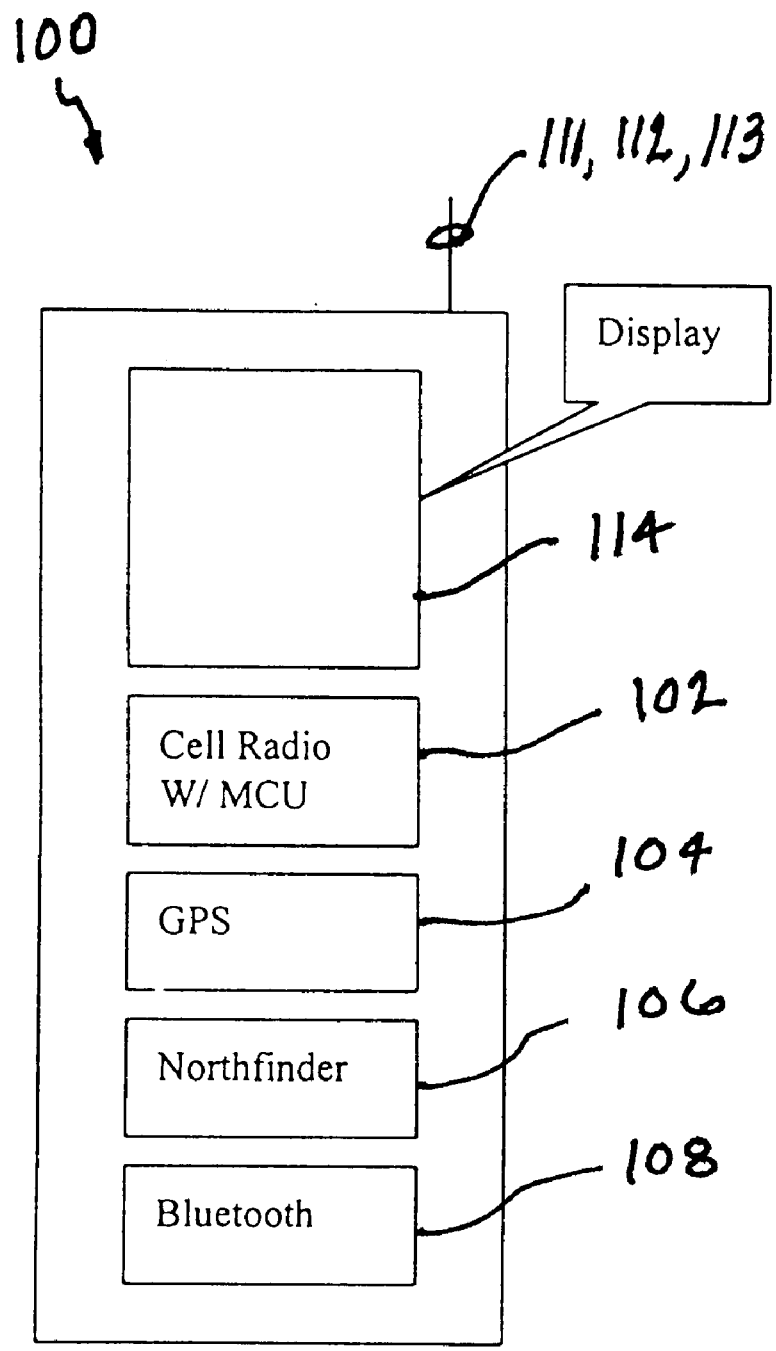
FIG. 1 illustrates a wireless location and direction indicator device according to one embodiment of the present invention.

FIG. 1 illustrates a portable wireless handheld location and direction indicator device 100 according to one embodiment of the present invention. The location and direction indicator device 100 is seen to include a cell phone 102, a GPS system 104, a Northfinder device 106 and a "BLUETOOTH" unit 108, as well as multiple transmit/receive antennas 111, 112, 113 and a display 114. A functional description of the portable wireless handheld location and direction indicator device 100 is now set forth below with reference to FIG. 2 that illustrates a communication system 200 implemented of portable wireless handheld location and direction indicator devices 202, 204 such as shown in FIG. 1. The devices 202, 204 are most preferably equipped with both "BLUETOOTH" and GPS capabilities. The present invention is not so limited however, and it shall be understood that numerous alternative embodiments of the devices 202, 204 can also be formulated to implement the present invention so long as the underlying relative location and direction indicating functionality is retained. The wireless location and direction indicator device 100, for example, can function within limited range parameters with or without GPS capabilities to provide the requisite location, distance and direction data. The indicator device 100 can also function with or without "BLUETOOTH" capabilities, for example, to accommodate extended communication ranges between a paging unit and a paged unit.

Figure 2:
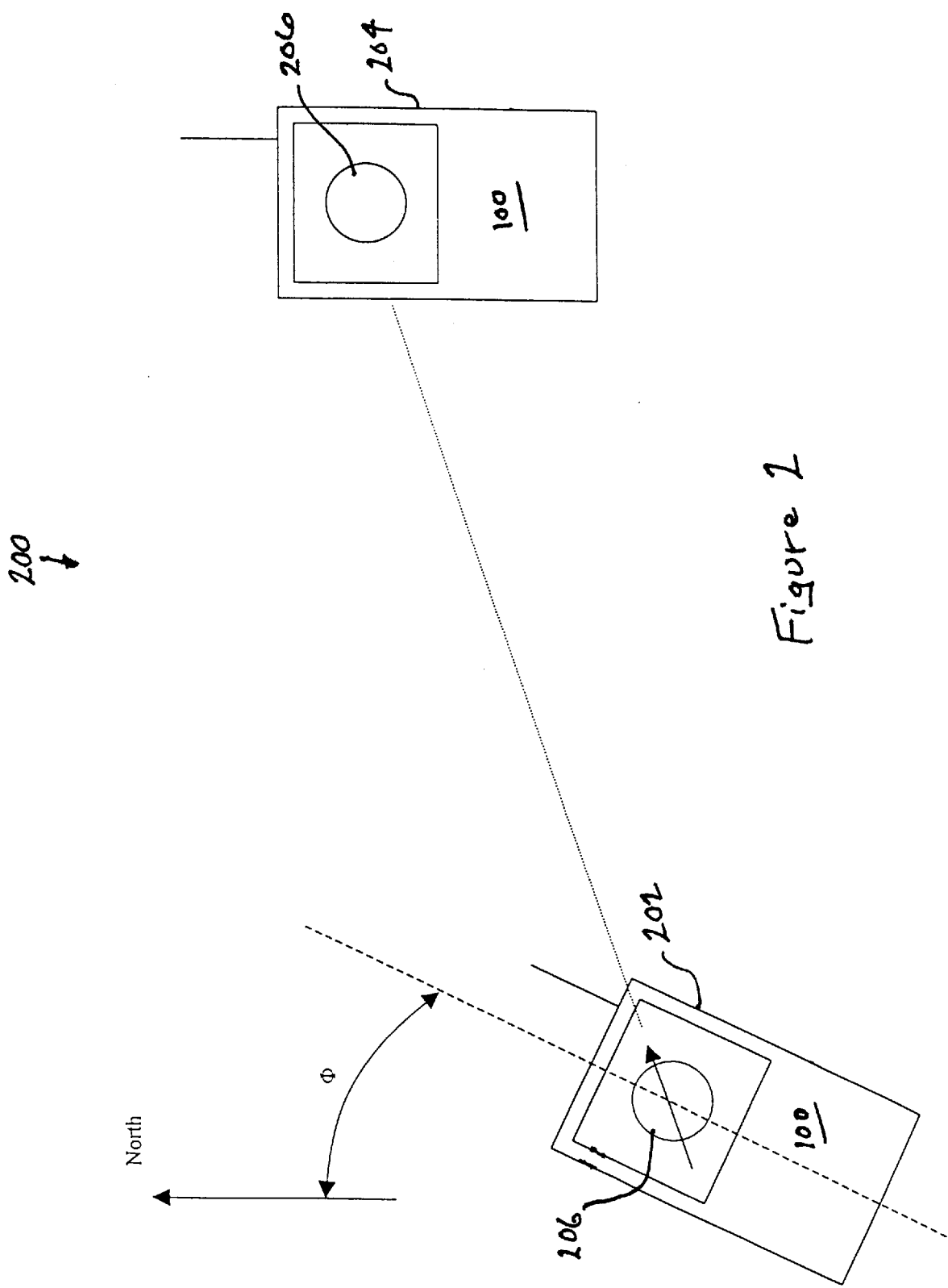
FIG. 2 illustrates a two-way communication system implemented of wireless location and direction indicator devices such as shown in FIG. 1.

With continued reference now to FIG. 2, a pair of wireless portable handheld location and direction indicator devices (100) 202, 204, each having GPS and "BLUETOOTH" features, includes a Northfinder device 206 such as a magnetic or electronic compass and also includes a protocol to communicate its present location relative to another like device 100. A user of one device (100) 202 seeking to locate another like device (100) 204 can, for example, operate a paging mode to page the other like device (100) 204. The other like device (100) 204 will be prompted to provide its present location. The other like device (100) 204 then transmits its location using either "BLUETOOTH" or cellular radio transmission techniques, or a combination of both, depending upon specific geographic and communication constraints based on location of the devices (100) 202, 204. The paging device (100) 202 then uses the location information provided by the paged device (100) 204 in combination with the angle between the longitudinal axis of the paging device (100) 202 and North (Φ) that is provided by the Northfinder 106 preferably comprising either a magnetic or electronic compass, and its own position to display the direction and distance to the paged device (100) 204. The direction indication(s) at the paging device (100) 202 are preferably exhibited on a display 114 and are most preferably updated continuously since the user of the paged device (100) 204 may be moving, e.g. walking, mobile and the like.

Radio communication between a paging device 202 and a paged device 204 can be implemented using a "BLUETOOTH" link 108 as described herein before, or through the cell radio 102, if extended range between the devices 202, 204 is necessary. Therefore, exact location of another device 100 relative to another like device 100 can be accurately pinpointed within short distances, even where GPS resolution is insufficient or unavailable. Such situations can arise, for example, in underground parking lots where GPS signals are not available and location/direction indications must be implemented using only the Northfinder 106 and "BLUETOOTH" reception. In such cases, the user must scan by holding the paging device 202 and its associated (most preferably dipole) antenna 111 parallel to the ground and then move the paging device 202 in an arc to cover all desired directions (scanning less than 360 degrees is generally sufficient) and then store the "BLUETOOTH" signal reception levels as a function of azimuth. The dipole antenna is most preferably an internal balanced antenna constructed of two patches, or may be, for example, a printed microstrip antenna or otherwise be comprised of two equal quarter-wave-length elements, rather than one element and ground. The present invention is not so limited however, and it shall be understood that other antenna configurations can also function to provide the desired directionality. Software uses the vector of amplitude as a function of angle, applies a curve fit and determines the likely direction. Knowledge of received phase (relative to the internal paging device clock) can also determine which path has the fewest reflections, thereby removing the effect of multi-path. Portable wireless location and direction indicator devices 100 can therefore be formulated with or without GPS devices 104 as desired to accommodate specific communication environments and protocols. When formulated without GPS devices 104, such devices 100 will of course be more limited in availability of applications and have more limited precision in location finding, but will be more power efficient and less costly.

More than two devices 100 can be used to implement a communication network (such as for use in association with a family unit or team having more than two members) with distinguishable identification (ID) indications for each member. Such ID information can be either entered manually or received through the cellular link when a certain number is called to page another like device 100. Location data, as stated herein before, can be associated either with fixed locations (e.g., retail shop, where there is no GPS unit, but a one-time calibration stored in non-volatile memory or entered manually), or variable locations (e.g., GPS based, such as associated with a temporary selling point, exhibitor booth, portable device 100 and the like). Use of portable devices 100 to provide location and direction indications, for example, is particularly useful to provide an alert when the distance between two specific devices 100 exceeds a certain userdefined threshold. One such application finds use in tracking a child in a shopping mall, regardless of whether the child remains in a fixed location or is moving.

A device (100) 204, fixed or mobile, in one application is phoned to provide its identification code that is used throughout communications between the locating (paging) device 202 and the target (paged) device 204 as the paging device 202 approaches the paged device 204. This application is particularly suitable for use in association with the integral GPS system 104. The present invention is not so limited however, and it shall be understood that the present device 100 can also be used to provide location and direction indications associated with fixed locations not equipped with other such devices 100. This application requires phoning a desired target to receive the requisite stationary location data associated with the target necessary to formulate location and direction indications. The relative location and direction indications are then implemented as in regular GPS-based navigation.

One or more devices 100 can further be formulated with multiple antennas to eliminate any necessity for scanning where GPS receivers may not function. Multiple, 3-axis, "BLUETOOTH" antennas 111, for example, can be used to determine a location associated with multi-story searches (e.g., department store). A 2-axis search mode can be implemented simply by holding a device 100 in a horizontal plane and using multiple in-plane antennas. A data processor such as a DSP associated with device 100 can analyze the antenna 111 (array) inputs and suppress extraneous reflections (sort out multi-paths, long delays) for buildings with high ceilings/roofs (shopping mall) to find people and objects limited to the given floor of the structure. Since multipath conditions are frequency dependent, each direction is most preferably characterized for the entire frequency band (e.g., by receiving an entire cycle of the "BLUETOOTH" hopping sequence); or the comparison must be performed within the same sub-band in which all channels can be assumed to be strongly correlated. Since the validity of each reception is confirmed through its contents (e.g., user ID), the device 100 is not mislead by interference from other sources in the same frequency band.

Although location and/or direction indications are described herein in association with a device display 114, additional indications can just as well be audible or touch sensitive. Such additional indications are particularly suitable to meet the needs of blind persons who may be using such a portable location and direction indicator device 100.

In summary explanation of the above, a wireless communications device 100 capable of cellular and/or "BLUETOOTH" communications between a target device 204 and a locating device 202 allows the transfer of identification data and either fixed or variable location data, as well as the analysis of an identified "BLUETOOTH" signal, in combination with indications from an electronic compass associated with a Northfinder, for the purpose of direction finding intended to overcome the absence of GPS data or inaccuracies in such GPS data. Alternatively, valid GPS data can be used in combination with indications from the electronic compass to implement the desired location and direction finding features where an extended communication range is necessary. When a user pushes a button on device A, it pages device B and asks for its location. Device B then transmits its location and device A uses the information in combination with the angle (θ) between a predetermined axis of device A and North that is provided by the compass, and its own position to display or otherwise non-visually (audible/touch sensitive) indicate the direction and distance to device B, regardless of whether device B is fixed or mobile. A cell phone equipped with "BLUETOOTH" features and having an integral compass and GPS will be useful as a navigation aid for hiking and traveling, even without communicating with other such devices. Such devices will serve, for example, to locate a family member, pet, car, shop, station, entrance/exit and the like. The graphic display 114 is preferably capable of supporting a clear arrow indicating the target direction, as well as its estimated distance.

This invention has been described in considerable detail in order to provide those skilled in the wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. Although the present invention has been described in association with a "BLUETOOTH" communication protocol and particular GPS conditions, for example, the present invention can be implemented using any suitable communication protocol along with optional GPS features capable of providing the information necessary to characterize the relative distance and direction between a locating device 100 and a specific target. Those skilled in the art of wireless communication will appreciate that the principles of the invention described and claimed herein also apply to wireless communications throughout the world. Further, signal processing methods of the present invention can be implemented in hardware or software, or a combination of both. In a preferred embodiment, the functions of a wireless location and direction indicator device 100 signal processing system, (including a GPS receiver 104, "BLUETOOTH" device 108, Northfinder 106, cell phone 102, display 114 and at least one antenna (array) 111, 112, 113), designed in conformance with the principals set forth herein are implemented as one or more integrated circuits using a suitable processing technology, e.g., CMOS, HBT.

Figure 3:
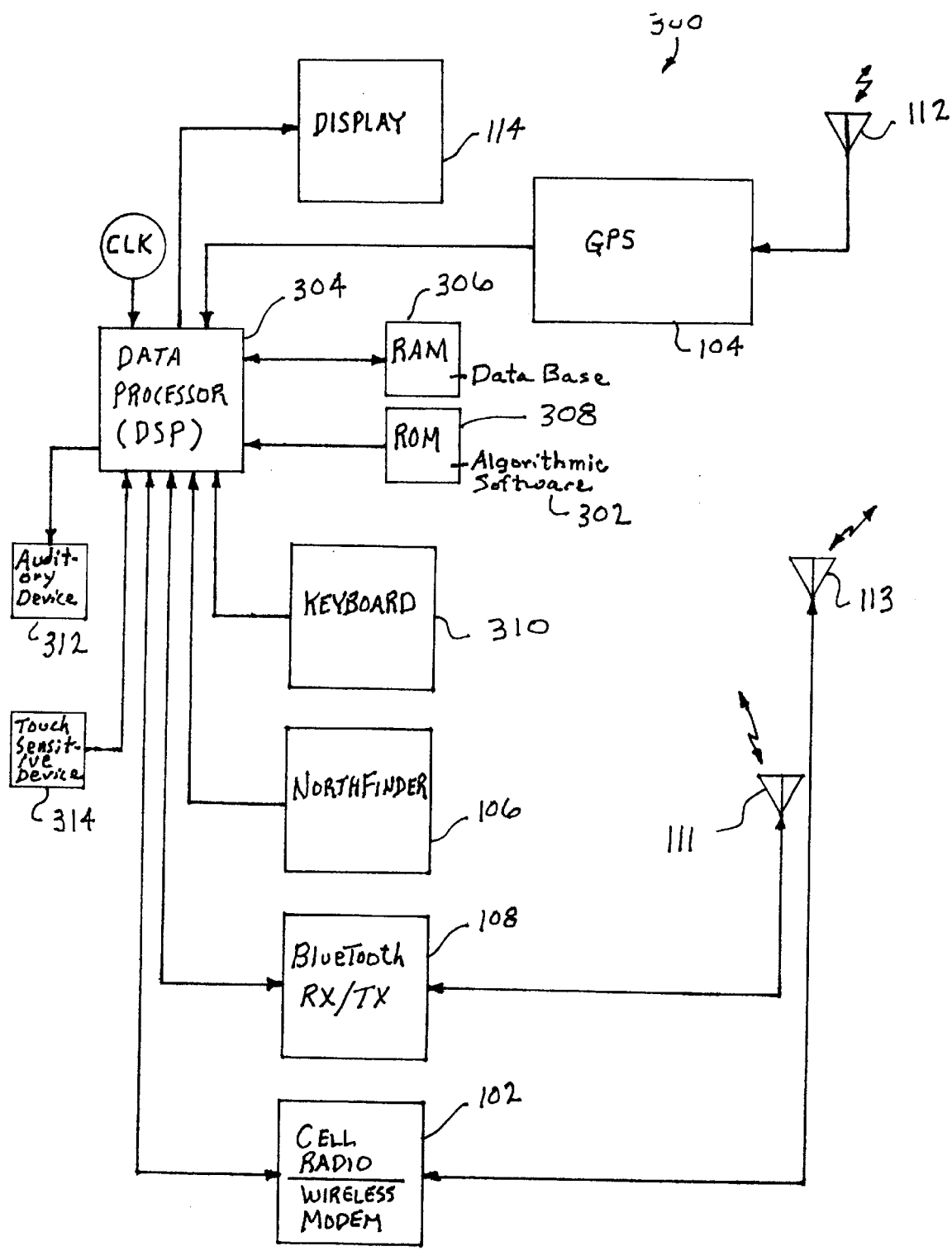
FIG. 3 is a simplified block diagram illustrating a system architecture suitable for implementing a wireless location and direction indicator according to one embodiment of the present invention.

As another example, illustrated in FIG. 3, at least portions of the present invention may be implemented in computer programs, i.e. algorithms 302, executing on programmable baseband systems 300 each comprising a data processor 304, e.g. DSP, a data storage system, including both volatile and non-volatile memory and/or data storage devices 306, 308, at least one input device 310, e.g. keyboard, A/D converter (part of GPS 104, "BLUETOOTH" 104, Cell radio 102), and at least one output device 114, 312, 314 e.g. display, auditory device 312, touch sensitive device 314, DI/A converter (part of GPS receiver 104, "BLUETOOTH" 108, Cell radio 102). Program code is applied to input data received via at least one antenna (array) 111, 112, 113 to perform the functions described herein and generate output information. The output information is applied to one or more output devices 114, in known fashion. Each such program may be implemented in a high level procedural or object oriented programming language to communicate with a baseband computer system 300. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor 304 to operate in a specific and predefined manner to perform the functions described herein. An example of one such type of data processor 304 is a digital signal processor (DSP).

What is claimed is:

1. A wireless location and direction indicator system comprising:
   at least one antenna;
   a BLUETOOTH system configured to receive via the at least one antenna, location data associated with a remote indicator system and generate received signal strength data as a function of azimuth therefrom;
   a Northfinder device; and
   a cellular communication radio comprising:
      a data processor;
      a data input device in communication with the data processor;
      an algorithmic software directing the data processor; and
      a data storage unit, wherein identification data and location data associated with a remote location and direction indicator system and received by the at least one antenna and Northfinder data generated by the Northfinder device is stored and supplied to the data processor such that the data processor, directed by the algorithmic software, can automatically derive relative distance data and relative direction data for a remote indicator system with respect to the indicator system using algorithmically defined relationships associated with the identification data, location data and Northfinder data.

2. The indicator system according to claim 1 further comprising a display device configured to receive and display the relative distance data and relative direction data.

3. The indicator system according to claim 2 wherein the display device is further configured to display an arrow pointing to a present location of a paged indicator device relative to a present location of the indicator device during a paging request.

4. The indicator system according to claim 1 further comprising a GPS system configured to generate discrete location data associated with the indicator system.

5. The indicator system according to claim 4 wherein the discrete location data associated with the indicator system comprises latitude, longitude and altitude datum intrinsically referenced to the electrical phase center of the at least one antenna.

6. The indicator system according to claim 1 further comprising an auditory output device configured to audibly convey the relative distance data and relative direction data to a system operator.

7. The indicator system according to claim 1 further comprising a sensory output device configured to convey touch sensitive indications associated with the relative distance data and relative direction data to a system operator.

8. The indicator system according to claim 1 wherein the location data associated with a remote location and direction indicator system comprises GPS data.

9. The indicator system according to claim 8 wherein the GPS data comprises latitude, longitude and altitude datum intrinsically referenced to the electrical phase center of at least one antenna associated with the remote location and direction indicator system.

10. The indicator system according to claim 1 wherein the location data associated with a remote location and direction indicator system comprises BLUETOOTH data.

11. The indicator system according to claim 1 wherein the location data associated with a remote location and direction indicator system comprises manually input data.

12. A wireless location and direction indicator system comprising:
   at least one antenna;
   a BLUETOOTH communication system configured to transmit and receive BLUETOOTH communication signals via the at least one antenna, and generate received signal strength data as a function of azimuth therefrom;
   a GPS communication system configured to generate discrete location data comprising latitude, longitude and altitude datum intrinsically referenced to the electrical phase center of the at least one antenna;
   a Northfinder device;
   a cellular communication radio comprising:
      a data processor;
      a data input device in communication with the data processor;
      an algorithmic software directing the data processor; and
      a data storage unit, wherein discrete identification data, discrete location data and discrete Northfinder data is stored and supplied to the data processor such that the data processor, directed by the algorithmic software, can automatically derive relative distance data and relative direction data for the location and direction indicator system with respect to a paging location and direction indicator system using algorithmically defined relationships associated with the discrete identification data, discrete location data and discrete Northfinder data, the cellular communication radio further comprising a microcontroller unit configured to selectively enable BLUETOOTH communication or cellular communication; and
   an output device selected from the group consisting of a display device, a touch sensitive device and an auditory device, wherein the output device is configured to receive and convey the relative distance and relative direction data to a location and direction system operator.

13. The indicator system according to claim 12 wherein the discrete location data is GPS data.

14. The indicator system according to claim 12 wherein the discrete location data is manually input data.

15. The indicator system according to claim 12 wherein the discrete location data is BLUETOOTH data.

16. A method of transferring location information through a wireless communication link, the method comprising the steps of:
   (a) providing a first cellular phone having a Northfinder and BLUETOOTH system integrated therein;
   (b) communicating with a second cellular phone having a Northfinder and BLUETOOTH system integrated therein to obtain BLUETOOTH signal strength information associated with the second cellular phone; and
   (c) processing Northfinder information associated with the first cellular phone in combination with the BLUETOOTH signal strength information associated with the second cellular phone to generate distance and direction data associated with the second cellular phone relative to a present position associated with the first cellular phone.

17. The method according to claim 16 further comprising the step of visually conveying the distance and direction data to a first cellular phone subscriber.

18. The method according to claim 16 further comprising the step of audibly conveying the distance and direction data to a first cellular phone subscriber.

19. The method according to claim 16 further comprising the step of physically conveying the distance and direction data to a first cellular phone subscriber.

* * * * *